United States Patent [19]

Lippmann et al.

[11] Patent Number: 5,453,258
[45] Date of Patent: Sep. 26, 1995

[54] METHOD OF REMOVING NITROGEN OXIDES FROM HOT FLUE GASES

[75] Inventors: Alfred Lippmann, Dormagen; Uwe Listner, Hürth; Martin Schweitzer, Odenthal, all of Germany

[73] Assignee: Bayer Aktiengesellschaft, Leverkusen, Germany

[21] Appl. No.: 236,795

[22] Filed: Apr. 29, 1994

[30] Foreign Application Priority Data

May 8, 1993 [DE] Germany ............ 43 15 385.2

[51] Int. Cl.⁶ .................................. C01B 21/04
[52] U.S. Cl. ........................................... 423/235
[58] Field of Search .................................. 423/235

[56] References Cited

U.S. PATENT DOCUMENTS

| | | | |
|---|---|---|---|
| 4,205,786 | 6/1980 | Babich et al. | 239/102 |
| 4,213,945 | 7/1980 | Haese et al. | 423/240 |
| 4,241,877 | 12/1980 | Hughes | 239/405 |
| 4,263,166 | 4/1981 | Adams | 252/359 R |
| 4,842,834 | 6/1989 | Burton | 423/235 |
| 4,963,332 | 10/1990 | Brand et al. | 423/235 |
| 5,199,255 | 4/1993 | Sun et al. | 60/39.02 |

FOREIGN PATENT DOCUMENTS

| | | |
|---|---|---|
| 0326943 | 8/1989 | European Pat. Off. . |
| 0337073 | 10/1989 | European Pat. Off. . |
| 0399980 | 11/1990 | European Pat. Off. . |
| 489537 | 1/1930 | Germany . |
| 3642612 | 6/1988 | Germany . |
| 3702561 | 8/1988 | Germany . |
| 3811636 | 3/1989 | Germany . |
| 3821832 | 11/1989 | Germany . |
| 4027040 | 12/1991 | Germany . |
| 4033787 | 5/1992 | Germany . |
| 1662647 | 7/1991 | U.S.S.R. . |
| 2096911 | 10/1982 | United Kingdom . |
| WO9005000 | 5/1990 | WIPO . |

*Primary Examiner*—Ferris Lander
*Assistant Examiner*—Thomas G. Dunn, Jr.
*Attorney, Agent, or Firm*—William C. Gerstenzang; Sprung Horn Kramer & Woods

[57] ABSTRACT

In the device for selective non-catalytic reduction of nitrogen oxides, a liquid nitrogen-containing reducing agent is sprayed through two-component lances into a stream of hot flue gases. Spraying occurs in pulsatory operation at a frequency of 5 to 70 per second, preferably 10 to 20 per second. As a result of this mode of operation, a spray cone of relatively coarse long-range drops and a spray cone of relatively fine short-range drops are produced alternately at each two-component nozzle. The reducing agent is ammonia dissolved in water (ammonia solution) at flue-gas temperatures of 1060° C. to 1170° C. The device for working the method comprises a flue-gas duct 3 incorporating a number of two-component lances 4 operated by a pressure medium. The liquid and gas feed pipes for each two-component nozzle lance 4 are connected to a first resonance chamber 15 disposed in the two-component nozzle and upstream of at least one additional resonance chamber 18 separated from the first resonance chamber 15 by a restrictor 17. The last resonance chamber 18, considered in the direction of flow, is then directly connected to the outlet opening 19 of the two-component nozzle.

2 Claims, 4 Drawing Sheets

METHOD OF REMOVING NITROGEN OXIDES FROM HOT FLUE GASES

The invention relates to a method of selective non-catalytic reduction of nitrogen oxides in hot flue gases, in which a liquid nitrogen-containing reducing agent is sprayed into the stream of flue gas at a temperature of 800°–1300° C. through two-component nozzles. Reduction of nitrogen oxides in streams of flue gases behind furnaces and waste-burning plants is an urgent contemporary problem, discussed in numerous publications. A comprehensive account can be found e.g. in the book by J. Kolar, Stickstoffoxide und Luftreinhaltung, Springer-Verlag, Berlin (1990).

In selective non-catalytic reduction of nitrogen oxides, use is made of the reducing properties of ammonia or other nitrogen-containing reducing agents such as urea or melamine. Reduction is homogeneous and in the gas phase, the resulting substances being molecular nitrogen, water and carbon dioxide. To obtain a minimum concentration of nitrogen oxides in the pure gas, the reducing agent has to be efficiently and uniformly distributed in the flow of gas. Theoretical calculations on models show that this process can reduce nitrogen oxides at an efficiency of 90%, but values of only about 60% have been hitherto obtained in practice.

This is the problem addressed by the invention. The aim is to improve the efficiency by improving the injection of the reducing agent. The choice and construction of the injection system are of prime importance.

To this end according to the invention, the two-component nozzles used for injection are operated in pulses at a frequency of 5 to 70 per second, preferably 10 to 20 per second, and a spray cone of relatively coarse long-range drops and a spray cone of relatively fine short-range drops are produced alternately at each two-component nozzle. Hitherto attempts have been made to atomise the liquid very finely, so as to produce a very wide drop surface area. By contrast, pulsatory spraying according to the invention results in a very wide range of drops, the coarse drops penetrating particularly far into the stationary or flowing flue gas. By this means, the cross-section of the flue-gas duct is uniformly supplied with vapour formed from the drops. Fine spray is produced in the near region of the two-component nozzles, whereas coarse spray, produced with a higher starting velocity and therefore having a greater range, evaporates in the more distant zones. This periodically pulsating changeover from coarse single-component spray to fine two-component spray broken away from the expanding pressure medium will hereinafter be called "hybrid atomisation". Surprisingly, this method increases the efficiency of elimination of nitrogen oxides to 95–99%. More particularly, laughing gas (NO) can be almost quantitatively removed from the flow of flue gas.

Particularly high rates of elimination of nitrogen oxide can be obtained if the liquid reducing agent is ammonia dissolved in water (ammonia solution) and is sprayed at flue-gas temperatures of 1060° to 1170° C. The elimination rate decreases if this temperature range is exceeded upwards or downwards.

Preferably the flow rates of compressed air and liquid are adjusted so that the proportional flow rate of air and liquid, averaged over time, at each two-component nozzle is in the range from 0.01 to 0.2, whereas the instantaneous proportional flow rate oscillates between an upper and a lower extreme value, the pulsation frequency corresponding to the pulsatory operation of the two-component nozzles.

Pulsatory operation can be brought about by periodically supplying the two-component nozzles with air or liquid. To this end, the supply of compressed air or liquid is periodically interrupted.

In a preferred embodiment, however, pulsatory operation is produced automatically by periodic starting processes in the two-component nozzle, while the supply of compressed air and liquid remains constant in time (automatic pulsatory operation).

The process is worked by two-component nozzle lances in which the liquid and gas supply pipes are connected to a first resonance chamber disposed in the two-component nozzle and connected upstream of at least one additional resonance chamber separated from the first resonance chamber by a restrictor. The last resonance chamber, considered in the direction of flow, is then directly connected to the outlet opening of the two-component nozzle.

Advantageously, the feed pipes for the pressure medium and the liquid opening into the first resonance chamber are constructed so that the two phases are conveyed into the first resonance chamber substantially without mixing.

To this end, use is made of a two-component nozzle in which the feed pipe for liquid comprises an inner tube disposed coaxially in a jacket tube and centred by segmental webs, whereas the pressure medium is supplied through the annular gap left between the jacket tube and the inner tube. In this embodiment also, the inner tube has outlet bores uniformly distributed over the periphery, extending at right angles to the nozzle axis, and formed on a distributor closed at one end, the bores, considered in the direction of flow, being disposed in the clearance space behind the segmental webs disposed in the annular gap cross-section. The outlet bores, accordingly, are axially in line with the segmental webs.

According to another feature of the invention, the volume of the first resonance chamber connected to the feed pipes for compressed air and liquid is adjustable. It has been found that the pulsation frequency can be varied and adjusted in this manner.

In practice, the inner tube and the distributor are axially movable in the jacket tube, so that the length of the first resonance chamber is adjustable.

Advantageously the nozzles are fan-jet nozzles.

The advantages of the invention are as follows:

Compared with the previously-known non-catalytic methods of removing nitrogen oxide from flue gases, the rate of elimination of $NO_x$ is considerably better (95% to 99%), even when operating in relatively large flue-gas cross-sections. Long-term tests have shown that this high rate of elimination can also be reliably maintained over long periods.

As a result of the better distribution of the nitrogen oxide-reducing liquid (the liquid reducing agent) in the flue gas, the number of two-component nozzles can be reduced (reduced investment costs). In addition, the quantities of atomising gas (pressure medium) for operating the two-component nozzles can be smaller, so that the operating costs can also be reduced in principle.

The quantities of harmful by-products, such as laughing gas or carbon monoxide, are extremely small.

Also, excess ammonia is efficiently burnt up, so that if hydrogen chloride and sulphur dioxide are present, practically no ammonium salts are found in the water effluent after wet flue-gas scrubbing.

The pulsation nozzles do not become worn or corroded, even after prolonged use. They also do not buckle or clog up.

Existing methods and plants can be adapted without difficulty to the process according to the invention. The plants can be retrofitted at relatively low cost.

The invention will now be described in detail with reference to drawings and embodiments. In the drawings:

BRIEF DESCRIPTION OF THE DRAWINGS

In FIGS. 1 and 2, flue gas coming from a combustion plant for removal of nitrogen flows through a cylindrical secondary-combustion chamber 1 over a wallpiece 2 into a flue-gas duct 3, which in the present case is a boiler flue pass. A nozzle lance 4 (see FIG. 2) is installed in inspection holes in each of the four corners of the boiler flue pass or flue-gas duct 3. The spray plane is marked 5 (see FIG. 1). Each nozzle lance 4 comprises a two-component nozzle with feed pipes for the liquid reducing agent (nitrogen oxide-reducing agent) for spraying and the pressure medium, e.g. compressed air, needed for atomisation. Each two-component nozzle produces a spray cone or spray fan 6. In FIG. 2, for clarity, the spray fans 6 are shown in the corners only, but in reality they interpenetrate, so as to cover the entire cross-section of the flue-gas duct 3.

Figure 1:
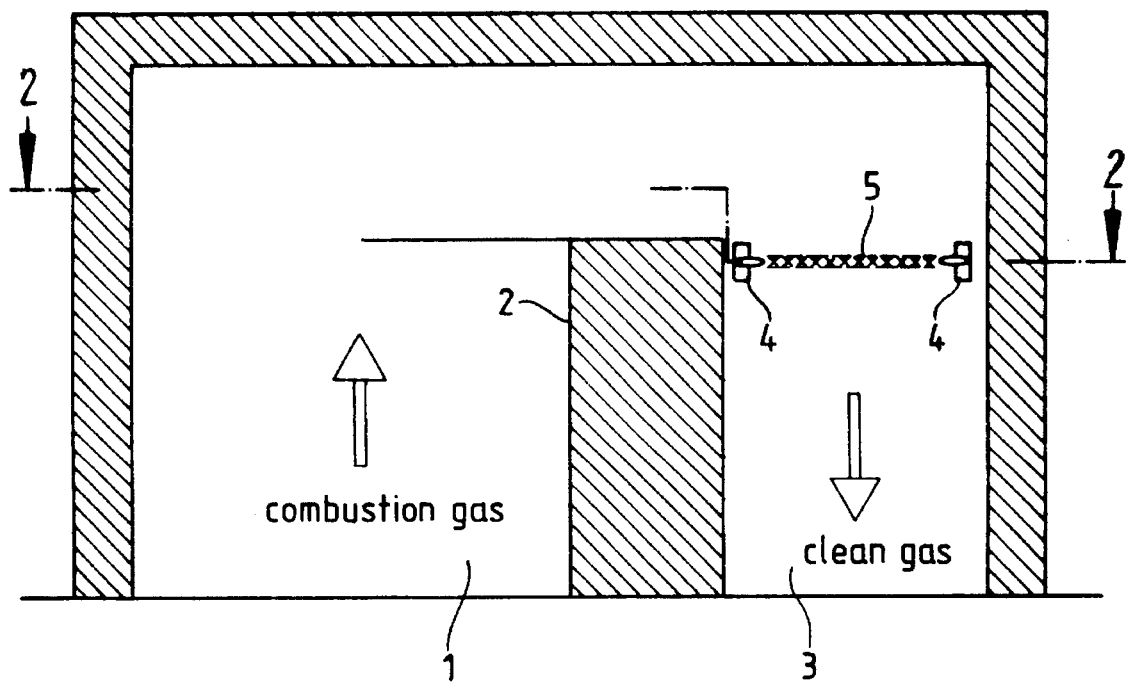
FIG. 1 is a diagrammatic cross-section through a secondary combustion chamber and an adjacent flue-gas duct.
Figure 2:
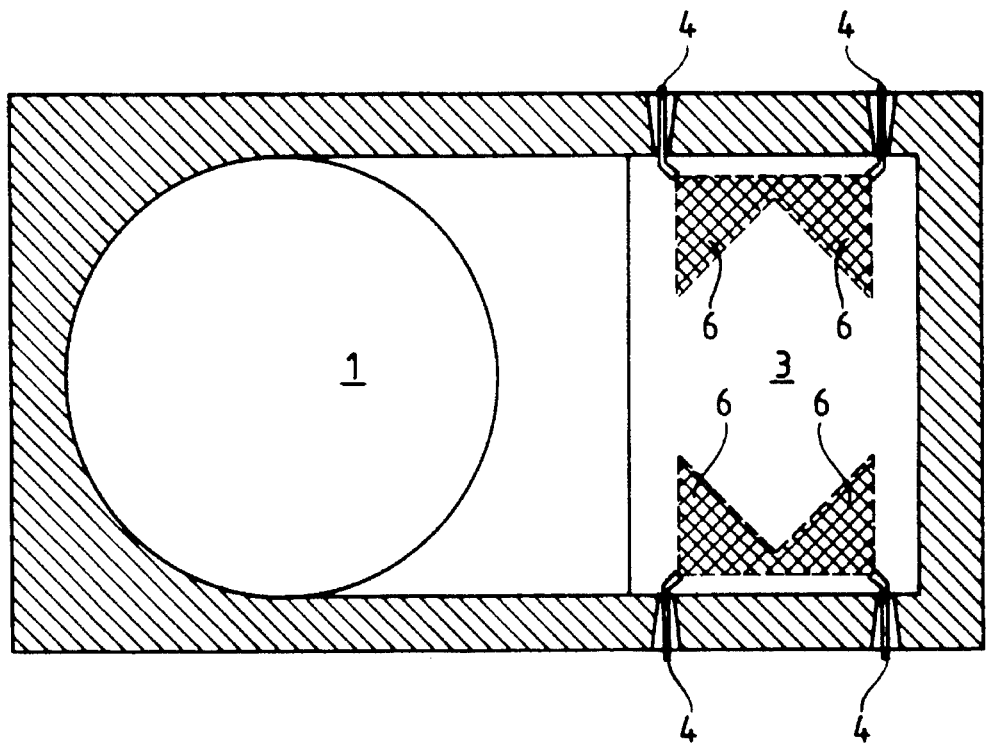
FIG. 2 is a section A–D through FIG. 1, showing more particularly the position of the novel lances in the flue-gas duct.
Figure 3:
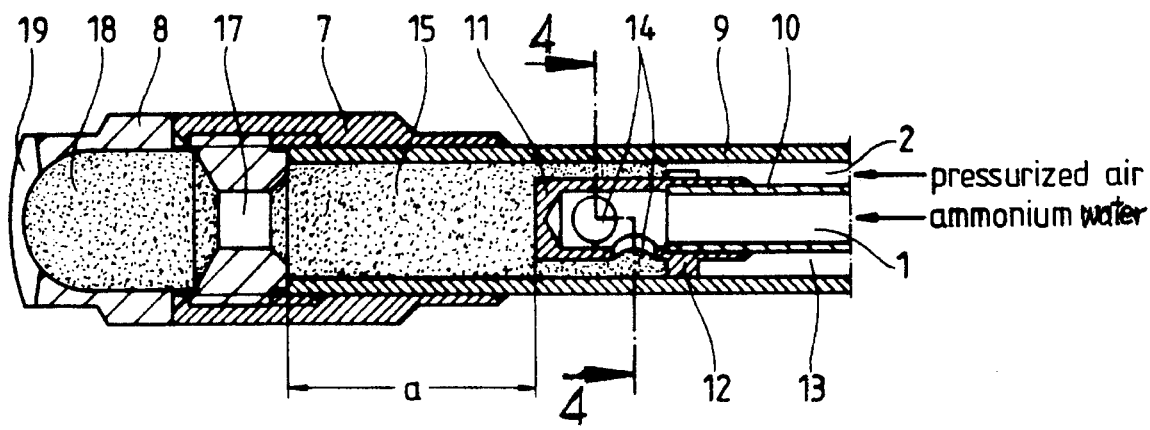
FIG. 3 shows the construction of a pulsation nozzle comprising resonance chambers.
Figure 4:
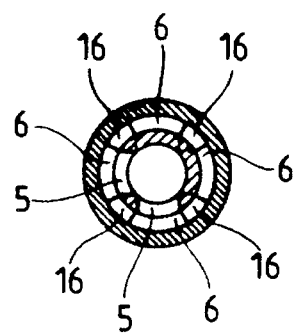
FIG. 4 is a cross-section A–D through the pulsation nozzle in FIG. 3.

The construction of the special pulsation nozzle used in the present case will be described with reference to FIGS. 3 and 4. The pulsation nozzle constitutes the front part of the nozzle lance 4 shown in FIGS. 1 and 2 and, as shown in FIGS. 3 and 4, comprises a commercial fan-jet nozzle 8 screwed into an integrally-welded sleeve 7, a jacket tube 9 permanently connected to the sleeve 7, an inner tube 10 axially movable in the jacket tube, and a liquid distributor 11 mounted in the inner tube. The inner tube 10 and distributor 11 are mounted in the jacket tube 9 so as to be axially movable on centring webs or ribs 12. The movable inner tube 10 needs to be sealed from the jacket tube 9, but this is not shown in the drawing. A liquid reducing agent for spraying (e.g. ammonia solution) flows through the inner tube 10 and a gaseous atomisation medium in the form of compressed air flows through the annular gap 13 between the inner tube 10 and the jacket tube 9. The liquid distributor 11 comprises a pipe portion closed at one end and mounted on the inner tube 10 and formed with outlet bores 14 offset from one another and disposed at right angles to the axis. The ammonia solution flows out of the inner tube 10 through the bores 14 into a first resonance chamber 15 adjoining the distributor 11, whereas compressed air is supplied through the annular gap between the inner tube 10 and the jacket tube 9. The compressed air flows through groove-like free surfaces 16 (see FIG. 4) between the centring webs (ribs) 12. The outlet bores 14 in the distributor 11 are disposed axially in line with the centring segments 12, which partly close the annular gap cross-section, i.e. the outlet bores 14 are situated in the clearance space or turbulent region behind the centring webs 12. This substantially prevents the liquid phase (ammonia) from mixing with the gaseous phase (compressed air) in the resonance chamber 15.

The long sides of the resonance chamber 15 are bounded by the jacket tube 9, the inlet end is bounded by the liquid distributor 11 and the outlet is bounded by a throttle or restrictor 17 having a cross-section considerably smaller than the inner diameter of the resonance chamber 15. When the inner tube 10 moves in the jacket tube 9, there is an alteration in the effective length a and consequently in the volume of the resonance chamber 15.

The throttle 17 is followed by an additional resonance chamber 18 (the last in the present case). A two-phase mixture of compressed air and ammonia solution in the second (or last) resonance chamber 18 enters the flue-gas duct through the actual nozzle opening in the nozzle head, which in the present case is in the form of a narrow rectangular slot 19. The second resonance chamber 18 can therefore alternatively be regarded as a spray chamber. In principle, however, more than two resonance chambers can be connected in series, each separated from the others by restrictors or throttles.

It has been found that when the two-jet nozzle is operated at a constant supply pressure of compressed air and ammonia solution, the liquid is ejected in pulses, the pulsation frequency being adjustable via the volume of the resonance chamber 15 and being situated in a typical frequency range of 5 to 70 per second. Research has shown that during pulsatory operation of this kind, a spray fan of relatively coarse long-range drops and a spray fan of relatively fine short-range drops is produced alternately at each two-component nozzle. The nozzle lances 4 can pulsate at different frequencies. The relatively coarse drops are produced in a phase when practically pure liquid is ejected, whereas the much smaller drops produced during the subsequent fine-spray phase are due to atomisation by the expanding compressed air. This hybrid atomisation results in a very wide range of drops, the large drops having a particularly long range. The result is a particularly uniform, efficient exchange of heat and matter between a small amount of liquid and a relatively large amount of gas. The spray is produced at a supply pressure of 0.8 to 2.5 bar and a proportional flow rate of pressure medium to liquid of 0.01 to 0.2.

Figure 5:
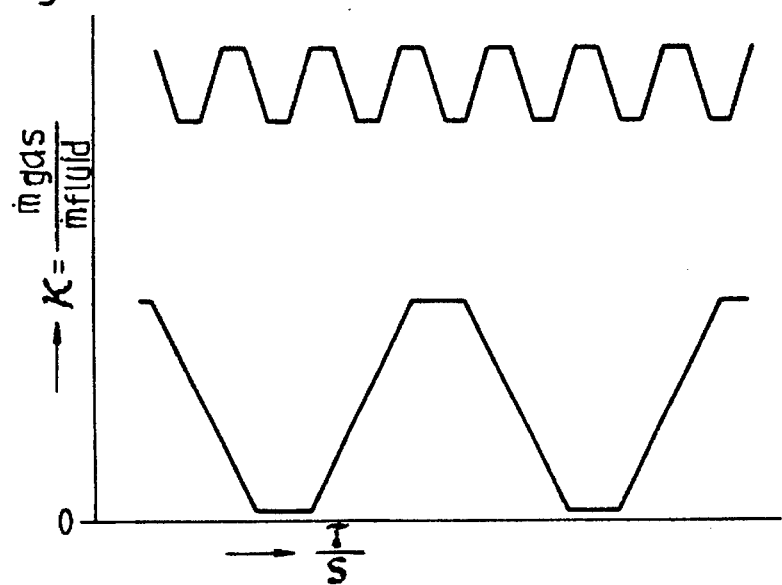
FIG. 5 shows the instantaneous proportional flow rates of air and liquid during pulsatory operation of the two-component nozzle.
Figure 6:
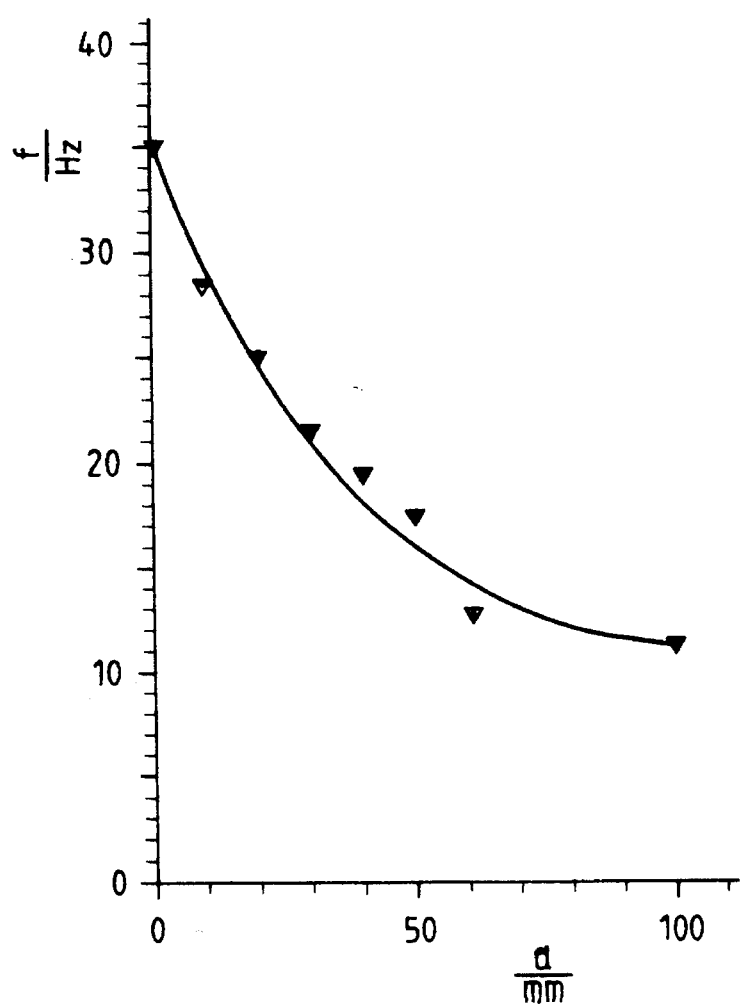
FIG. 6 shows the relation between the pulsation frequency and the length of the first resonance chamber in the two-component nozzle.

FIG. 5 is a graph showing the instantaneous proportional flow rate K during pulsatory operation of the two-component nozzle in FIG. 3, plotted as a function of time. In one extreme case, liquid and compressed air flow alternately through the throttle 17, whereas in the other extreme case there is practically no alteration in the proportional flow rate K of the gaseous and the liquid phase, which flow simultaneously through the restrictor. A liquid-gas mixture having a periodically varying composition flows from the spray chamber 18 (the last resonance chamber) through the fan-jet nozzle outlet surface 19 into the flue-gas duct. As FIG. 5 shows, the proportional flow rate K tends from an upper limiting value, corresponding to a high proportion of gaseous atomisation medium in the total material flowing through the nozzle slot 19, to a lower limiting value, and then returns to the maximum value. The upper limiting value corresponds to the state of fine atomisation with a short range of action, whereas the lower limiting value corresponds to formation of coarse drops having a long range. The process is periodically repeated. The repetition frequency or pulsation frequency can be altered in controlled manner by increasing or reducing the volume of the resonance chamber 15. If for example the volume is increased by increasing the distance a, the pulsation frequency decreases (bottom part of FIG. 5) whereas if the volume is reduced, the frequency increases (FIG. 5, top). FIG. 6 shows the relation between the pulsation frequency and the length a of the resonance chamber 15, measured in a two-component nozzle as per FIGS. 3 and 4. The volume of the resonance chamber 15 can also be altered by providing additional chambers, which are connected when necessary.

Pulsatory operation in the previously-described resonance chamber two-component nozzle occurs automatically (automatic pulsation). As an alternative to automatic pulsation, forced pulsation can be brought about by periodically supplying compressed air or liquid to a two-component nozzle. This can be done e.g. via "flutter" valves incorporated in the feed pipes for compressed air or liquid.

EXAMPLE

The following description is of an example of removal of nitrogen from a stream of flue gas by using the automatic-pulsation two-component nozzles described previously. In a combustion plant, about 80 000 m³/h of flue gas from a cylindrical secondary-combustion chamber 1 (see FIG. 1) was supplied over a wallpiece 2 into a boiler-flue pass 3 described as a "flue gas duct" and having corners containing nozzle lances 4 equipped with automatically pulsating nozzles. The temperature in the secondary combustion chamber 1 was 1120° C. The flue-gas temperature in the injection plane 5 was about 50° C. to 90° C. lower. 230 l/h of 25% ammonia solution for removing nitrogen oxides was sprayed through each nozzle lance into the flue-gas duct 3. The nozzle supply pressure was 1.7 bar (both for the spray air and for the ammonia solution), and the mass ratio of the two components was 0.026. The pulsation frequency was about 17 per second.

Figure 7:
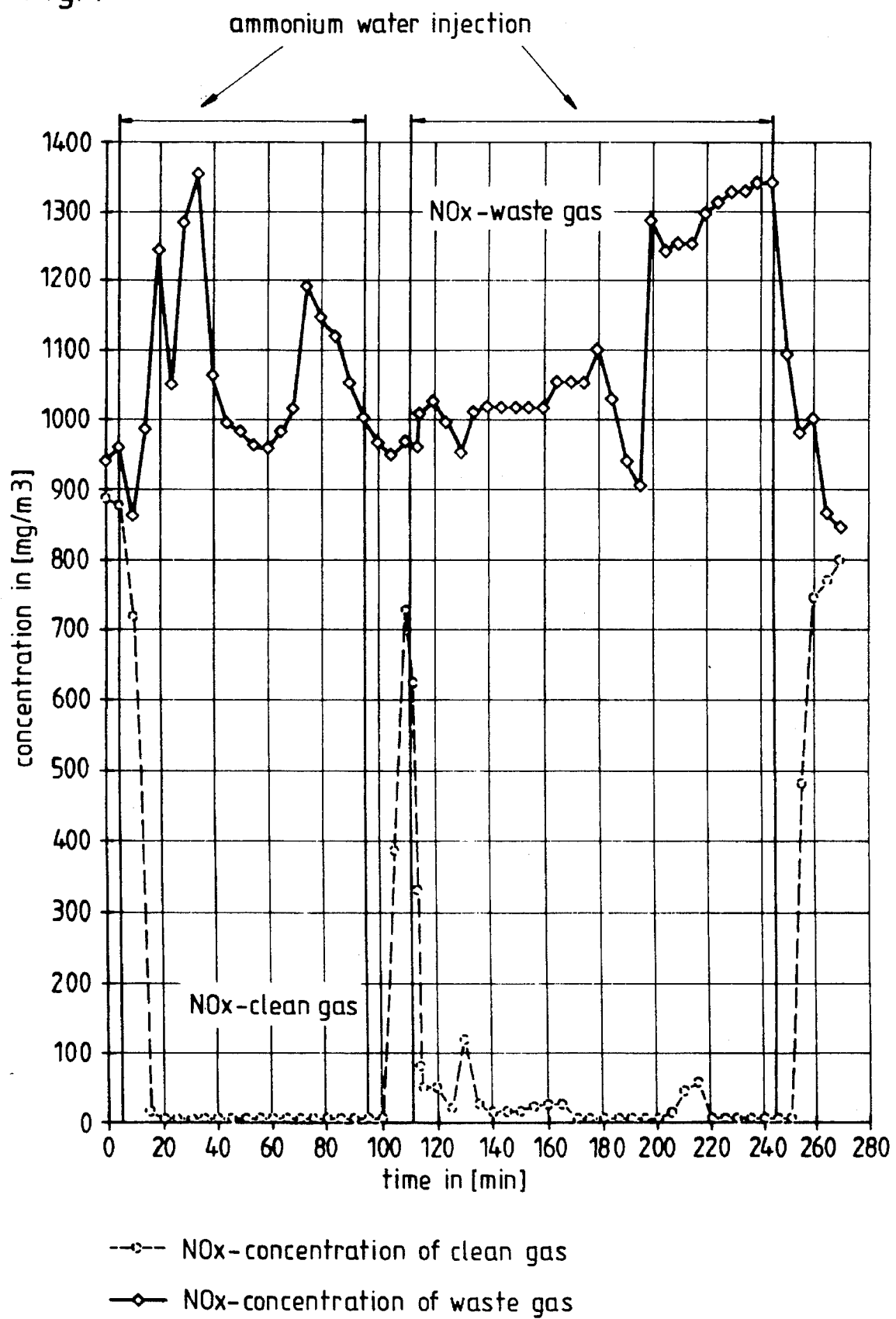
FIG. 7 shows the concentration of nitrogen oxides in the raw gas and the pure gas, measured as a function of time during a test run.

FIG. 7 shows the test results obtained under these conditions. The diagram shows the variation in nitrogen oxides in the raw and pure gas during a test period of 270 minutes. The concentrations of nitrogen oxides in the raw gas were measured in the secondary combustion chamber 1 and the concentrations in the pure gas were measured in the flue-gas duct 3 downstream of the nozzle lances 4, using an $NO_x$ analyser manufactured by Messrs Rosemount. When ammonia solution was sprayed in under the aforementioned conditions during automatic pulsatory operation, the $NO_x$ concentration was reduced from a maximum of 1350 mg/m³ to a residual value below 10 mg/m³ in the pure gas. When spraying was discontinued (after about 100 minutes) the $NO_x$ concentration rose to 800 mg/m³. When additional nitrogen oxide-reducing agent was added (after about 110 minutes) the concentration of nitrogen oxide in the pure gas again fell to below 10 mg/m³. In the method of reducing nitrogen according to the invention, therefore, the elimination rate was over 98%.

We claim:

1. A process for selective non-catalytic reduction of nitrogen oxides in a hot-effluent gas, comprising
    spraying a liquid reducing agent containing nitrogen into the effluent gas stream at a temperature of 800°–1300° C. in the absence of a catalyst, wherein the spraying is accomplished by,
    (a) providing at least one binary phase nozzle injection system to which the nitrogen containing liquid and a compressed gas are supplied, and
    (b) periodically operating the nozzle at a pulse frequency of between 5 and 70 sec$^{-1}$, and discharging from the nozzle a spray cone of relatively coarse long range drops of said reducing agent followed by a spray cone of relatively fine short range drops of said reducing agent, wherein the mass flow rate ratio of the compressed gas to the nitrogen containing liquid oscillates to produce the coarse and fine drops.

2. A process according to claim 1, wherein the nitrogen containing liquid and a compressed gas are supplied to a first resonance chamber connected to at least one additional resonance chamber disposed upstream within the nozzle injection system, the resonance chambers being separated from each other by a throttle and the last resonance chamber in the direction of flow communicating with the nozzle outlet.

* * * * *